United States Patent
Bippus et al.

(10) Patent No.: US 10,685,452 B2
(45) Date of Patent: Jun. 16, 2020

(54) REGISTRATION APPARATUS FOR REGISTERING IMAGES

(71) Applicant: KONINKLIJKE PHILIPS N.V., Eindhoven (NL)

(72) Inventors: Rolf Dieter Bippus, Hamburg (DE); Sven Kabus, Hamburg (DE); Michael Grass, Buchholz In Der Nordheide (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 3 days.

(21) Appl. No.: 15/574,962

(22) PCT Filed: Jun. 17, 2016

(86) PCT No.: PCT/EP2016/063972
§ 371 (c)(1),
(2) Date: Nov. 17, 2017

(87) PCT Pub. No.: WO2017/001210
PCT Pub. Date: Jan. 5, 2017

(65) Prior Publication Data
US 2018/0174314 A1    Jun. 21, 2018

(30) Foreign Application Priority Data
Jun. 30, 2015   (EP) ..................... 15174551

(51) Int. Cl.
*G06T 7/35*    (2017.01)
*G06T 7/33*    (2017.01)
(Continued)

(52) U.S. Cl.
CPC .............. *G06T 7/35* (2017.01); *G06T 3/0075* (2013.01); *G06T 7/33* (2017.01); *G06T 11/006* (2013.01);
(Continued)

(58) Field of Classification Search
None
See application file for complete search history.

(56) References Cited

U.S. PATENT DOCUMENTS 6,836,567 B1 * 12/2004 Silver ...................... G06K 9/32
382/199
9,230,348 B2 * 1/2016 Proksa .................. G06T 11/006
(Continued)

FOREIGN PATENT DOCUMENTS

WO    2011/027298    3/2011

OTHER PUBLICATIONS

Neumann, et al., "Robust Model-Based 3D/3D Fusion Using Sparse Matching for Minimally Invasive Surgery", Sep. 22, 2013.
(Continued)

*Primary Examiner* — Leon Viet Q Nguyen
(74) *Attorney, Agent, or Firm* — Larry Liberchuk (57) ABSTRACT

The invention relates to a registration apparatus (14) for registering images comprising a unit (11) for providing a first and a second image of an object, such that an image element of the first image at a respective position has been reconstructed by multiplying projection data values of rays traversing the image element with weights and by backprojecting the weighted projection data values, a unit (12) for providing a confidence map comprising for different positions in the first image confidence values being indicative of a likelihood that an image feature is caused by a structure of the object, the confidence value being calculated as a sum of a function, which depends on the respective weight, over the rays traversing the respective image element, and a unit (13) for determining a transformation for registering the first and second image to each other under consideration of the confidence map.

14 Claims, 3 Drawing Sheets

(51) Int. Cl.
*G06T 3/00* (2006.01)
*G06T 11/00* (2006.01)
(52) U.S. Cl.
CPC ............... *G06T 2207/10081* (2013.01); *G06T 2207/20076* (2013.01); *G06T 2207/30048* (2013.01); *G06T 2207/30104* (2013.01)

(56) References Cited

U.S. PATENT DOCUMENTS

| | | | | |
|---|---|---|---|---|
| 2006/0132655 | A1* | 6/2006 | Makram-Ebeid | G06T 5/20 348/571 |
| 2007/0297660 | A1* | 12/2007 | Hsieh | A61B 6/032 382/131 |
| 2011/0142313 | A1 | 6/2011 | Pack | |
| 2012/0121147 | A1* | 5/2012 | Huang | G06T 7/32 382/131 |
| 2012/0148136 | A1* | 6/2012 | Nielsen | G06T 11/005 382/131 |
| 2014/0369463 | A1* | 12/2014 | Thibault | G01N 23/046 378/19 |
| 2014/0376791 | A1* | 12/2014 | Heigl | G06T 11/008 382/128 |

OTHER PUBLICATIONS

Stayman, et al., "Model-Based Tomographic Reconstructions of Objects Containing Known Components", IEEE Transactions on Medical Imaging, vol. 31, No. 10, Oct. 1, 2012.
Brendel et al., "Motion Compensated Backprojection versus Backproject-then-Warp for Motion Compensated Reconstruction", The Third International Conference on Image Formation in X-Ray Computed Tomography, pp. 169 to 172, Salt Lake City, USA (2014).
Koehler et al., "Correction of Breathing Motion in the Thorax for Helical CT", Tsinghua Science and Technology, vol. 15, No. 1, pp. 87 to 95 (2010).
Bhagalia et al., "Nonrigid registration-based coronary artery motion correction for cardiac computed tomography" Medical Physics, vol. 39, pp. 4245 to 4254 (2012).
Kim et al., "Cardiac motion correction based on partial angle reconstructed images in x-ray CT", Medical Physics, 42 (5):2560 (2015).
Stevendaal et al., "A motion-compensated scheme for helical cone-beam reconstruction in cardiac CT angiography", Medical Physics, vol. 35, No. 7, pp. 3239 to 3251 (2008).
Isola, et al., "Motion-compensated iterative cone-beam CT image reconstruction with adapted blobs as basis functions", Physics in Medicine and Biology, 2008, 53, 6777-6797.

* cited by examiner

REGISTRATION APPARATUS FOR REGISTERING IMAGES

CROSS REFERENCE TO RELATED APPLICATIONS

This application is the U.S. National Phase application under 35 U.S.C. § 371 of International Application No. PCT/EP2016/063972, filed Jun. 17, 2016, published as WO 2017/001210 on Jan. 5, 2017, which claims the benefit of European Patent Application Number 15174551.0 filed Jun. 30, 2015. These applications are hereby incorporated by reference herein.

FIELD OF THE INVENTION

The invention relates to a registration apparatus and method for registering images. The invention relates further to a computer program for controlling the registration apparatus and an imaging system for generating an image of a moving object, which comprises the registration apparatus.

BACKGROUND OF THE INVENTION

WO 2011/027298 A1 discloses a projection values processing apparatus for processing acquired projection values, wherein the projection values processing apparatus comprises an acquired projection values providing unit for providing acquired projection values, a reconstruction unit for reconstructing a first image from the acquired projection values under consideration of a reconstruction assumption, and a simulated projection values determining unit for determining simulated projection values by simulating a projection through the reconstructed first image under consideration of the reconstruction assumption. The projection values processing apparatus further comprises an inconsistency determining unit for determining inconsistency values for the acquired projection values, wherein an inconsistency value is indicative of a degree of inconsistency of a respective acquired projection value with the reconstruction assumption, by comparing the acquired projection values and the simulated projection values.

The article "Robust Model-Based 3D/3D Fusion Using Sparse Matching for Minimally Invasive Surgery" by D. Neumann et al., MICCAI 2013, Part I, LNCS 8149, pages 171 to 178 (2013) discloses a sparse matching approach for fusing a high quality pre-operative computed tomography (CT) image and a non-contrasted, non-gated intra-operative C-arm CT image by utilizing robust machine learning and numerical optimization techniques.

The article "Model-Based Tomographic Reconstruction of Objects Containing Known Components" by J. Webster et al., IEEE Transactions on Medical Imaging, volume 31, number 10, pages 1837 to 1848 (2012) discloses integrating physical models of manufactured components into CT reconstruction algorithms, in order to reduce artifacts in CT images. In particular, a model-based penalized-likelihood estimation reconstruction algorithm is used, which explicitly incorporates known information about the geometry and composition of the respective manufactured component.

The article "Motion Compensated Backprojection versus Backproject-then-Warp for Motion Compensated Reconstruction" by B. Brendel et al., The Third International Conference on Image Formation in X-Ray Computed Tomography, pages 169 to 172, Salt Lake City, USA (2014) discloses a CT system for generating an image of a fast moving organ like the heart. The CT system is adapted to firstly estimate the motion of the fast moving organ and to secondly reconstruct an image of the fast moving organ using the estimated motion. For estimating the motion the CT system reconstructs images of the fast moving organ without motion compensation for different times and registers these images.

The quality of the registration of the images, which have been reconstructed without motion compensation for different times, can be reduced due to image artifacts, wherein this reduced registration quality can lead to a reduced quality of the motion estimation. Reconstructing an image of the fast moving organ based on this motion estimation can finally lead to a reconstructed image having significant motion artifacts.

SUMMARY OF THE INVENTION

It is an object of the present invention to provide a registration apparatus and method which allow for an improved registration of images. It is a further object of the present invention to provide an imaging system for generating an image of a moving object, which comprises the registration apparatus, and a computer program for controlling the registration apparatus.

In a first aspect of the present invention a registration apparatus for registering images is presented, wherein the registration apparatus comprises:
  an images providing unit for providing a first image and a second image of an object, wherein the images providing unit is adapted to provide the first image such that an image element of the first image at a respective position has been reconstructed by multiplying projection data values, which are assigned to rays traversing the image element, with weights and by backprojecting the weighted projection data values along the rays,
  a confidence map providing unit for providing a confidence map comprising for different positions in the first image confidence values being indicative of a likelihood that an image feature is caused by a structure of the object, wherein the confidence map providing unit is adapted to determine for the image element a confidence value by calculating a sum of a function, which depends on the respective weight, over the rays traversing the image element,
  a registration unit for determining a registration transformation for registering the first image and the second image to each other under consideration of the confidence map.

Since the confidence map providing unit provides a confidence map comprising for different positions in the first image confidence values being indicative of a likelihood that an image feature is caused by a structure of the object and since the registration unit determines a registration transformation for registering the first image and the second image to each other under consideration of the confidence map, during the determination of the registration transformation it can be considered which image features, which should be used for registering the first image and the second image to each other, are very likely caused by structures of the object and which of these image features are very likely not caused by structures of the object. For instance, if the confidence map indicates that a certain image feature is very likely not caused by a structure of the object, but by an image artifact, the registration unit may not use this image feature for determining the registration transformation, whereas, if the confidence map indicates that a certain image feature is very likely caused by a structure of the object, the registration unit may use this image feature for determining the registration transformation. Thus, by considering the confidence map while determining the registration transformation the quality of the registration of the first image and the second image to each other can be improved.

The different positions in the first image, for which confidence values are provided, can be positions of image values, especially voxel or pixel positions. Correspondingly, the image features, for which confidence values are determined at these positions, can be the image values, especially voxel values or pixel values.

The images providing unit preferentially provides CT images. It can provide more than two images; in particular, it can provide a sequence of images of the object, wherein for each of these images a confidence map may be provided. The provided sequence of images preferentially shows the object at different times, wherein the registration unit is preferentially adapted to register these images to each other by determining corresponding registration transformations. For instance, these images may be registered to each other by defining that one of these images is a reference image and by determining registration transformations defining registrations of all other images to this reference image. It is also possible to register the images to each other in another way. For example, temporally neighboring images may be registered with each other by determining corresponding registration transformations. The determined registration transformations describing registrations of images showing the object at different times can be used for determining a motion field, especially a motion vector field, which can finally be used for reconstructing a motion-compensated image of the object. The object is preferentially a moving object, particularly a moving organ like the heart of a person or of an animal.

The images providing unit may be a storing unit in which the first and second images of the object are stored already and from which the stored images can be retrieved for providing the same. However, the images providing unit can also be a receiving unit for receiving the images from, for instance, a reconstruction unit which is adapted to reconstruct the images based on projection data values which have been acquired by a projection data value acquisition apparatus in different acquisition directions, wherein the projection data values are preferentially line integrals. The images providing unit can also be the reconstruction unit itself or a combination of the reconstruction unit with a projection data value acquisition apparatus.

The confidence map providing unit can be a storing unit in which the confidence map is stored already and from which the confidence map can be retrieved for providing the same. However, the confidence map providing unit can also be a receiving unit for receiving the confidence map from a confidence map determination unit which determines the confidence map. The confidence map providing unit can also be the confidence map determining unit, i.e. the confidence map providing unit can be adapted to determine, especially calculate, the confidence map. The confidence map providing unit can be adapted to provide for an image a single confidence map or several confidence maps.

In an embodiment the confidence map providing unit is adapted to provide a directional confidence map comprising for different positions in the first image confidence values being indicative of a directional likelihood that an image feature is caused by a structure of the object. Thus, in an embodiment the confidence values may be direction dependent. In particular, for different directions in the image space different confidence values may be provided for a same position in the first image. Especially if directional image structures like edges or gradients are used by the registration unit for registering the first image and the second image to each other, the registration can be further improved by using a directional confidence map. However, the confidence map providing unit may also be adapted to provide an isotropic confidence map comprising for different positions in the first image confidence values being indicative of an isotropic likelihood that an image feature is caused by a structure of the object. Hence, in an embodiment the confidence values may be direction independent.

The images providing unit is adapted to provide the first image such that an image element of the first image at a respective position has been reconstructed by multiplying projection data values, which are assigned to rays traversing the image element, with weights and by backprojecting the weighted projection data values along the rays, wherein the confidence map providing unit is adapted to determine for the image element and hence for the respective position a confidence value by calculating a sum of a function, which depends on the respective weight, over the rays traversing the image element. In particular, for determining a confidence value for an image element at a respective position in the first image only weights are considered, which have been used, during backprojection, for weighting the projection data values which are assigned to rays traversing the image element, i.e. weights for weighting the projection data values which are assigned to rays not traversing the image element are not considered.

For instance, the weights, with which the projection data values have been multiplied before having been backprojected for reconstructing the respective image element, can be summed, in order to determine a confidence value for the respective image element. It is also possible that the respective squared weights are summed for determining a confidence value for the respective image element. If these confidence values are determined for different image elements of the first image, they may form an isotropic confidence map. The sum of the function, which depends on the respective weight, over the rays traversing the respective image element, for which the confidence value should be determined, is indicative of the amount of projection data values, which have been used for reconstructing this image element of the first image, wherein it is assumed that, if a larger amount of projection data values has been used for reconstructing this image element, the image element corresponds more likely to a structure of the object.

It is preferred that the function further depends on the inverse variance of the respective projection data value. For instance, a confidence value for an image element can be determined by calculating a sum of a function over the rays traversing the image element, wherein the function depends on a product of a) the respective weight or the respective squared weight and b) the inverse variance of the respective projection data value. If this confidence value is determined for different image elements of the first image, they may form an isotropic confidence map. It is assumed that the likelihood that an image element of the first image really corresponds to a structure of the object is larger, if the variances of the projection data values, which have been used for reconstructing this image element of the first image, are smaller, and that this likelihood is smaller, if the variances of the projection data values, which have been used for reconstructing this image element of the first image, are larger. Thus, by considering the inverse variance of the respective projection data values while determining the confidence value of the image element the quality of determining the confidence value may be improved.

Preferentially, each ray has a ray angle relative to a reference line, wherein the function further depends on the respective ray angle. For instance, the function can depend on the cosine or the sine of the respective ray angle or of twice the respective ray angle. In an embodiment the function depends on a product of a) the respective weight or the respective squared weight and b) the cosine or the sine of the respective ray angle or of twice the respective ray angle. The function can further depend on the inverse variance of the respective projection data value. In particular, a confidence value for an image element can be determined by calculating a sum of a function over the rays traversing the image element, wherein the function depends on a product of a) the respective weight or the respective squared weight, b) the cosine or sine of the respective ray angle or of twice the respective ray angle and c) the inverse variance of the respective projection data value. Confidence values, which are determined based on the respective ray angle for different image elements of the first image, can be used for forming a directional confidence map.

In an embodiment the confidence map providing unit is adapted to i) determine for the respective image element a first intermediate value by calculating a sum of a first function, which depends on the respective weight and which has a first dependence on the respective ray angle, over the rays traversing the image element, ii) determine for the respective image element a second intermediate value by calculating a sum of a second function, which depends on the respective weight and which has a second dependence on the respective ray angle, over the rays traversing the image element, and iii) determine the confidence value for the respective image element based on the determined first and second intermediate values. In a preferred embodiment the confidence map providing unit is adapted such that the first function and the second function further depend on the inverse variance of the respective projection data value. Moreover, the confidence map providing unit may be adapted to determine for the respective image element a third intermediate value by calculating a sum of a third function, which depends on the weight of the respective projection data value, but which does not depend on the respective ray angle, over the rays traversing the image element, and to determine the confidence value for the image element based on the determined first, second and third intermediate values. The confidence map providing unit may be adapted such that the third function further depends on the inverse variance of the respective projection data value.

In particular, a confidence value can be determined for an image element of the first image by combining the first, second and third intermediate values determined for this image element, wherein i) the first intermediate value may be determined by calculating the sum of the first function over the rays traversing this image element, wherein the first function may depend on a product of a) a weight, with which the respective projection data value of the respective ray is weighted for reconstructing this image element, or the square of this weight, b) the cosine of the respective ray angle or twice the respective ray angle, and optionally c) the inverse variance of the respective projection data value, ii) the second intermediate value may be determined by calculating the sum of the second function over the rays traversing this image element, wherein the second function may depend on a product of a) a weight, with which the respective projection data value of the respective ray is weighted for reconstructing this image element, or the square of this weight, b) the sine of the respective ray angle or of twice the respective ray angle, and optionally c) the inverse variance of the respective projection data value, and iii) the third intermediate value may be determined by calculating the sum of the third function over the rays traversing this image element, wherein the third function may depend on a weight, with which the respective projection data value of the respective ray is weighted for reconstructing this image element of the first image, or the square of this weight, optionally multiplied with the inverse variance of the respective projection data value. After the confidence values have been determined for different image elements of the first image, they preferentially form a directional confidence map.

In an embodiment the registration unit is adapted to determine a force vector field by applying a force vector field determination algorithm to the first image and to the second image, wherein the force vector field indicates for different positions within at least one of the first and second images virtual forces to be applied to the at least one of the first and second images for registering the first and second images to each other, to correct the force vector field by using the confidence map and to determine the registration transformation based on the corrected force vector field. Thus, based on the first image and the second image a force vector field can be determined for a) the first image only, b) the second image only or c) the first image and the second image. Correspondingly, the registration transformation can define a deformation of the first image only, a deformation of the second image only or a deformation of both images. Before applying the force vector field to the at least one of the first and second images, force vectors of the force vector field may be multiplied by corresponding confidence values for correcting the force vectors. Preferentially, the registration transformation is determined by smoothing the corrected force vector field. In particular, a regularization step may be performed for smoothing the force vector field. This kind of determining the registration transformation based on the corrected force vector field can lead to a further improved registration of the first and second images to each other.

The steps of determining the force vector field, correcting the force vector field and determining the registration transformation may be performed iteratively. For instance, in an initial step an initial force vector field may be determined for the first image by applying the force vector field determination algorithm to the first and second images. This initial force vector field may be corrected by using the confidence map and the corrected initial force vector field may be used for determining an initial registration transformation for the first image. This initial registration transformation may then be applied to the first image, thereby transforming, especially deforming, the same. In a first iteration step the force vector field may be determined by applying the force vector field determination algorithm to the transformed first image and to the second image, the force vector field may be corrected by transforming also the confidence map and by using the deformed confidence map, the corrected force vector field may be used for determining a registration transformation and the determined registration transformation may be applied to the transformed first image. In each iteration step the transformed first image and a transformed confidence map may be used, which are transformed in accordance with the transformation determined in the previous iteration step.

In an embodiment the confidence map providing unit is adapted to provide a further confidence map comprising for different positions in the second image confidence values being indicative of a likelihood that an image feature is caused by a structure of the object, wherein the registration unit is adapted to determine a registration transformation for registering the first and second images to each other under consideration of a) the confidence map comprising for different positions in the first image confidence values being indicative of a likelihood that an image feature is caused by a structure of the object, and b) the further confidence map. Thus, a first confidence map may be provided for the first image and a second confidence map may be provided for the second image, wherein for registering the first image and the second image to each other both confidence maps may be used. For instance, the first confidence map and the second confidence map may be combined to a combined confidence map, wherein a force vector field may be determined by applying a force vector field determination algorithm to the first image and to the second image, wherein the force vector field may indicate for different positions within the first image and/or for different positions within the second image virtual forces to be applied to the first image and/or the second image, respectively, for registering the first image and the second image to each other, wherein the force vector field may be corrected depending on the combined confidence map and wherein the registration transformation may be determined based on the correct force vector field. Also in this embodiment the registration unit may be adapted to determine the registration transformation for registering the first image and the second image to each other iteratively, wherein in each iteration step confidence values of the first confidence map and of the second confidence map, which under consideration of the current registration transformation correspond to each other, are combined and used for correcting the force vector field. The combination of the corresponding confidence values can be, for instance, a multiplication.

In another aspect of the present invention an imaging system for generating an image of a moving object is presented, wherein the imaging system comprises:
  a registration apparatus as defined in claim 1 for determining a registration transformation for registering a first image and a second image to each other, wherein the images providing unit is adapted to provide the first image and the second image such that they show the same object at different times, wherein the first and second images have been reconstructed based on projection data values acquired in different acquisition directions,
  a motion field determination unit for determining a motion field describing a movement of the object based on the determined registration transformation,
  wherein the images providing unit is adapted to reconstruct a motion-compensated image of the object based on the provided projection data values and the determined motion field.

Since the registration apparatus uses the confidence map for determining the registration transformation for registering the first image and the second image to each other, the quality of the registration and hence the quality of the determined motion field can be improved, which in turn can lead to an improved motion-compensated reconstruction of the image of the object.

In an embodiment the images providing unit is adapted to provide partial scan images as the first image and the second image. A partial scan image is an image comprising image elements, which have been reconstructed based on rays, which do not cover a full 180 degree view angle range, i.e. the partial scan images are reconstructed by using rays and corresponding projection data values, which cover a smaller angular range. The projection data values needed for reconstructing a partial scan image can therefore be acquired faster, which can lead to a higher temporal resolution, if several images of the object are reconstructed, which correspond to different times. In particular, the temporal distance between the first image and the second image can be smaller. After a registration transformation has been determined for these images, an improved motion field can therefore be determined. This can lead to a further improved quality of the finally reconstructed motion-compensated image of the object.

In a further aspect of the present invention a registration method for registering images is presented, wherein the registration method comprises:
  providing a first image and a second image of an object by an images providing unit, wherein the first image is provided such that an image element of the first image at a respective position has been reconstructed by multiplying projection data values, which are assigned to rays traversing the image element, with weights and by backprojecting the weighted projection data values along the rays,
  providing a confidence map comprising for different positions in the first image confidence values being indicative of a likelihood that an image feature is caused by a structure of the object by a confidence map providing unit, wherein a confidence value for the image element is determined by calculating a sum of a function, which depends on the respective weight, over the rays traversing the image element,
  determining a registration transformation for registering the first image and the second image to each other under consideration of the confidence map by a registration unit.

In another aspect of the present invention a computer program for controlling a registration apparatus as defined in claim 1 is presented, wherein the computer program comprises program code means for causing the registration apparatus to carry out the registration method as defined in claim 13, when the computer program is run on the registration apparatus.

It shall be understood that the registration apparatus, the imaging system, the registration method, and the computer program have similar and/or identical preferred embodiments, in particular, as defined in the dependent claims.

It shall be understood that a preferred embodiment of the present invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 1:
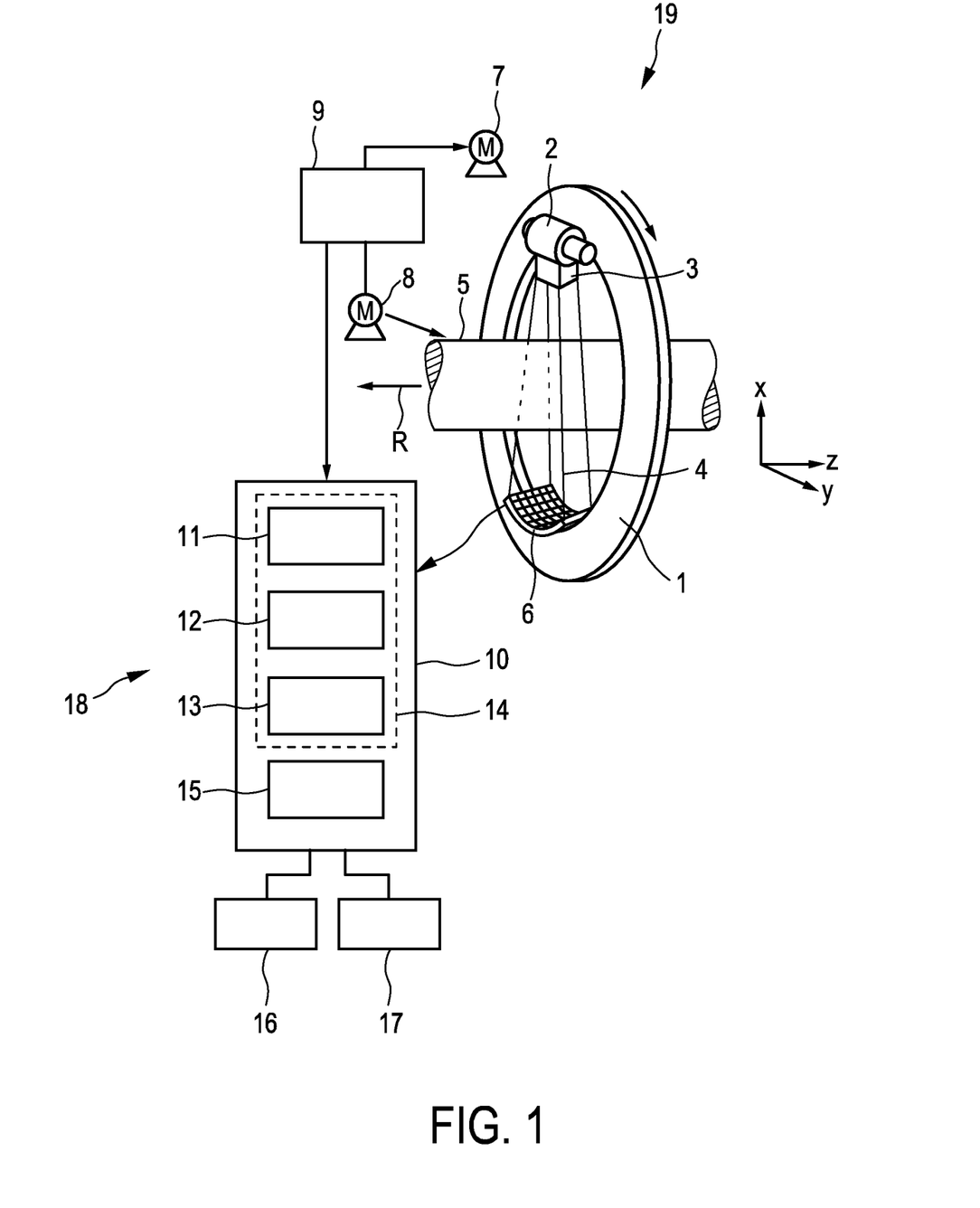
FIG. 1 shows schematically and exemplarily an embodiment of a CT system for generating an image of a moving object.

FIG. 1 shows schematically and exemplarily an embodiment of an imaging system for generating an image of a moving object. In this embodiment the object is the heart of a person and the imaging system is a CT system 18 for generating a motion-compensated CT image of the object. The CT system 18 comprises a projection data values acquisition apparatus 19 for acquiring projection data values of the object in different acquisition directions and a processing device 10 for processing the acquired projection data values, in order to generate the motion-compensated CT image of the object which can be shown on a display 17. The CT system 18 further comprises an input unit 16 like a keyboard, a computer mouse, a touchpad, et cetera, in order to allow a user to input commands for, for instance, starting an acquisition of projection data values, to input parameters like acquisition parameters or reconstruction parameters, et cetera.

The projection data values acquisition apparatus 19 includes a gantry 1 which is capable of rotation about a rotational axis R which extends parallel to a z direction. A radiation source 2 which is, in this embodiment, an x-ray tube, is mounted on the gantry 1. The radiation source 2 is provided with a collimator 3 which forms, in this embodiment, a conical radiation beam 4 from the radiation generated by the radiation source 2. The radiation traverses the object (not shown) within an examination zone 5 being, in this embodiment, cylindrical. After having traversed the examination zone 5 the radiation beam 4 is incident on a detector 6 which comprises a two-dimensional detection surface, wherein also the detector 6 is mounted on the gantry 1.

The projection data values acquisition apparatus 19 further comprises two motors 7, 8. The gantry is driven at a preferably constant but adjustable angular speed by the motor 7. The motor 8 is provided for displacing the object parallel to the direction of the rotational axis R or the z axis. For instance, a patient may be arranged on a support means like a patient table, which is displaceable by using the motor 8, in order to displace the heart of the patient parallel to the direction of the rotational axis R or the z axis. These motors 7, 8 are controlled by a control unit 9 such that the radiation source 2 and the object move relatively to each other along, for instance, a helical trajectory. However, it is also possible that the object is not displaced by using the motor 8, but that only the radiation source 2 is rotated, i.e. that the radiation source 2 moves along a circular trajectory relative to the object. Furthermore, in another embodiment the collimator 3 can be adapted to form another beam shape, in particular, a fan beam, and the detector 6 can comprise a detection surface, which is shaped corresponding to the other beam shape, in particular, to the fan beam.

During the relative movement of the radiation source 2 and the object the detector 6 generates projection data values depending on the radiation incident on the detection surface of the detector 6. In this embodiment the projection data values are filtered line integrals as generally used by standard filtered backprojection CT reconstruction algorithms.

The acquired projection data values are provided to the processing device 10 for allowing the processing device 10 to reconstruct the motion-compensated CT image based on the acquired projection data values. The control unit 9 may be adapted to also control the processing device 10. However, also a further control unit can be provided for controlling the processing device 10 or for controlling components of the processing device 10 or other components of the CT system 18.

The processing device 10 comprises an images providing unit 11 for providing at least a first image and a second image of the moving object. In this embodiment the images providing unit 11 is a reconstruction unit for reconstructing a sequence of partial scan images of the object, which correspond to different times. The generation of the partial scan images will in the following be described in more detail with reference to FIG. 2.

Figure 2:
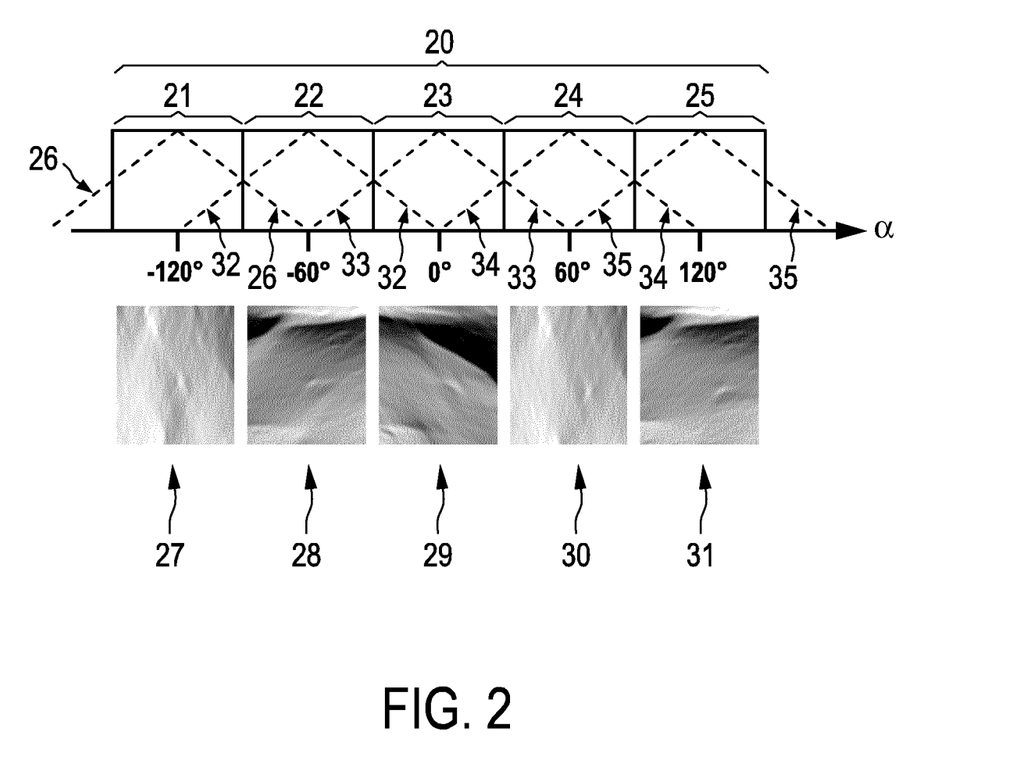
FIG. 2 illustrates a reconstruction of partial scan images.

For reconstructing an image 27 projection data values covering a range of 120 degrees enclosed by the broken lines 26 are used. The broken lines 26 also illustrate an angular weighting function which may be used for weighting the projection data values within this angular range of 120 degrees before backprojecting the projection data values. The angular weighting function indicated by the broken lines 26 has a triangular shape and results in a full width at half maximum (FWHM) of 60 degrees effective angular range as indicated by the box 21. Also for further partial scan images 28, 29, 30, 31 projection data values are used, which cover a respective angular range of 120 degrees enclosed by corresponding broken lines 32, 33, 34, 35. These broken lines 32, 33, 34, 35 also define angular weighting functions having a triangular shape, which may be used for weighting the projection data values. These weightings result in a FWHM of 60 degrees effective angular ranges 22, 23, 24, 25, wherein in this example the effective angular ranges 21, 22, 23, 24, 25 cover an angular range 20 of 300 degrees.

The reconstruction unit 11 can be adapted to reconstruct the partial scan images in accordance with following equation:

$$BP(\bar{x}) = \sum_n pw_n \cdot A(\bar{x}, n, \bar{d}) \cdot proj(\bar{d}(\bar{x}, n), n), \quad (1)$$

wherein $\bar{x}=(x,y,z)$ indicates an image voxel coordinate in the respective reconstructed partial scan image, $BP(\bar{x})$ denotes the respective reconstructed voxel value at the image voxel coordinate $\bar{x}$, n denotes an index indicating a respective ray, i.e. a respective projection ray, wherein n runs over all projection rays traversing a specific voxel position $\bar{x}$, $pw_n$ denotes a partial weight, $\bar{d}(\bar{x},n)=(d_u,d_v)$ denotes the position on the detection surface of the detector 6, at which the projection ray, which is indicated by n and which traverses the image voxel coordinate $\bar{x}$, meets the surface of the detector 6, $A(\bar{x},n,\bar{d})$ denotes a pi-partner normalized aperture and view profile weight, wherein a view preferentially refers to all projection values which have been acquired for a same single detector/source position, and $proj(\bar{d},n)$ denotes a projection data value or an interpolated projection data value at the position $\bar{d}$ on the surface of the detector 6, wherein the projection data value is preferentially a filtered line integral. For more details regarding the reconstruction of the partial scan images, especially the partial weight $pw_n$, which corresponds to the broken lines 32, 33, 34, 35 in FIG. 2, and the pi-partner normalized aperture and view profile weight $A(\bar{x},n,\bar{d})$, reference is made to the articles "Correction of Breathing Motion in the Thorax for Helical CT" by T. Koehler et al., Tsinghua Science and Technology, volume 15, number 1, pages 87 to 95 (2010), "Nonrigid registration-based coronary artery motion correction for cardiac computed tomography" by R. Bhagalia et al., Medical Physics, volume 39, pages 4245 to 4254 (2012) and "Cardiac motion correction based on partial angle reconstructed images in x-ray CT" by K. Seungeon et al., Medical Physics, 42 (5):2560 (2015), which are herewith incorporated by reference.

The processing device 10 further comprises a confidence map providing unit 12 for providing confidence maps comprising confidence values indicating for different positions in the reconstructed partial scan images a likelihood that an image feature is really caused by a structure of the object and not by artifacts like motion artifacts caused by the motion of the heart or limited angle artifacts which may be present due to the limited angular ranges of projection data values used for reconstructing the partial scan images.

The confidence map providing unit 12 may be adapted to determine for each voxel of a partial scan image one or more confidence values. In particular, the confidence map providing unit 12 may provide isotropic confidence values $S_1(\bar{x})$ that stand for isotropic confidences of the voxel values at the voxel positions $\bar{x}$ and/or it may provide directional confidence values $S_D(\bar{x},\varphi_r)$ that depend on the voxel positions $\bar{x}$ and angles $\omega_r$. The directional confidence values can serve as a direct measure of uncertainty at a position $\bar{x}$ for features making use of structural information along a direction denoted by $\varphi_r$ and form a directional confidence map. The angle $\varphi_r$ is preferentially measured as a rotation angle around the rotational axis or the z axis of the CT system and here determines the direction in which a confidence is to be determined. The angle $\varphi_r$ can be determined with respect to a reference line being perpendicular to the rotational axis or the z axis, wherein the reference line may be defined by, for instance, the position of the radiation source at the beginning of acquiring the projection data. However, the reference line can also be another line being perpendicular to the rotational axis or the z axis.

In particular, the confidence map providing unit 12 can be adapted to determine for a voxel an isotropic confidence value $S_1(\bar{x})$ by calculating a sum of a function, which depends on the respective combined weights $pw_n \cdot A(\bar{x},n,\bar{d})$, over all rays traversing the voxel. The function may further depend on the inverse variance $[\sigma^2(n,\bar{d})]^{-1}$ of the respective projection data value $proj(\bar{d},n)$. In an embodiment the isotropic confidence values can be defined by following equation (2):

$$S_I(\bar{x}) = \sum_n pw_n^2 \cdot A^2(\bar{x}, n, \bar{d}) \cdot [\sigma^2(n, \bar{d})]^{-1} \quad (2)$$

Moreover, the confidence map providing unit 12 can be adapted to determine for a voxel a directional confidence value $S_D(\bar{x},\varphi_r)$ by calculating a sum of a function, which depends on the respective combined weights $pw_n \cdot A(\bar{x},n,\bar{d})$, over all rays traversing the voxel, and which depends on a subfunction $F(\varphi_n-\varphi_r)$, wherein $\varphi_n$ is the respective ray angle and $\varphi_r$ is a reference angle of a reference line. The subfunction $F(\varphi_n-\varphi_r)$ may be any function which depends on $\varphi_n$ and $\varphi_r$. The function, which is summed up, may further depend on the inverse variance of the respective projection data value $proj(\bar{d},n)$. In particular, directional confidence values may be determined in accordance with following equation:

$$S_D(\bar{x}, \varphi_r) = \sum_n pw_n^2 \cdot A^2(\bar{x}, n, \bar{d}) \cdot [\sigma^2(n, \bar{d})]^{-1} \cdot F(\varphi_n - \varphi_r). \quad (3)$$

In an embodiment the confidence map providing unit 12 is adapted to provide the directional confidence map by firstly determining for each voxel of a respective partial scan image a first intermediate value $I_{sin\ 2}(\bar{x})$, a second intermediate value $I_{cos\ 2}(\bar{x})$ and a third intermediate value in accordance with following equations:

$$I_{sin2}(\bar{x}) = \sum_n pw_n^2 \cdot A^2(\bar{x}, n, \bar{d}) \cdot [\sigma^2(n, \bar{d})]^{-1} \cdot \sin(2 \cdot \varphi_n), \quad (4)$$

$$I_{cos2}(\bar{x}) = \sum_n pw_n^2 \cdot A^2(\bar{x}, n, \bar{d}) \cdot [\sigma^2(n, \bar{d})]^{-1} \cdot \cos(2 \cdot \varphi_n) \text{ and} \quad (5)$$

$$I(\bar{x}) = \sum_n pw_n^2 \cdot A^2(\bar{x}, n, \bar{d}) \cdot [\sigma^2(n, \bar{d})]^{-1}, \quad (6)$$

wherein in equations (4) and (5) the angle $\varphi_n$ denotes the respective ray angle.

The first intermediate value $I_{sin\ 2}(\bar{x})$ is determined by calculating a sum of a first function, which depends on the respective combined weight $pw_n \cdot A(\bar{x},n,\bar{d})$, which depends on the inverse variance $[\sigma^2(n,\bar{d})]^{-1}$ and which has a first dependence on the respective ray angle $\varphi_n$, over the rays traversing the respective voxel. Preferentially the ray angle $\varphi_n$ refers to the rotation angle around the central axis of the CT system, i.e. around the rotational axis or z axis of the CT system, wherein the reference line may be an arbitrary fixed line being perpendicular to the central axis. In an embodiment the reference line is defined by the position of the radiation source or the position of the detector at the time when the acquisition of the projection data values starts. The second intermediate value $I_{cos\ 2}(\bar{x})$ is determined by calculating a sum of a second function, which depends on the respective combined weight $pw_n \cdot A(\bar{x},n,\bar{d})$, which depends on the respective inverse variance $[\sigma^{-2}(n,\bar{d})]^{-1}$ and which has a second dependence on the respective ray angle $\varphi_n$, over the rays traversing the respective voxel. The third intermediate value is determined by calculating a sum of a third function, which depends on the respective combined weight $pw_n \cdot A(\bar{x},n,\bar{d})$ and on the respective inverse variance $[\sigma^2(n,\bar{d})]^{-1}$, over the rays traversing the respective voxel.

The confidence map providing unit 12 can be adapted to combine the first intermediate value, the second intermediate value and the third intermediate value by using following relationship $$\sum_i a_i \cos^2(\varphi_i - \varphi_r) = \frac{1}{2} \cdot \left(\sum_i a_i + \cos(2\varphi_r)\sum_i a_i \cos(2\varphi_i) + \sin(2\varphi_r)\sum_i a_i \sin(2\varphi_i)\right). \quad (7)$$

Thus, the confidence map providing unit 12 can be adapted to combine the intermediate values in accordance with following equation:

$$S_D(\bar{x},\varphi_r) = \frac{1}{2} \cdot (I(\bar{x}) + \sin(2\cdot\varphi_r)I_{sin\ 2}(\bar{x}) + \cos(2\cdot\varphi_r)I_{cos\ 2}(\bar{x})), \quad (8)$$

wherein the resulting confidence values $S_D(\bar{x},\varphi_r)$ can serve as a direct measure of uncertainty at a position x for features making use of structural information along a direction denoted by $\varphi_r$ and are directional confidence values forming a directional map. Using equation (8) the confidence map providing unit 12 can be adapted to calculate values $S_D(\bar{x},\varphi_r)$ for arbitrary angles $\varphi_r$ as needed by the registration.

The processing device 10 further comprises a registration unit 13 for determining a registration transformation for registering temporally subsequent partial scan images to each other under consideration of the directional confidence map. In particular, the registration unit 13 may be adapted to determine a force vector field by applying a force vector field determination algorithm to respective temporally neighboring partial scan images, wherein the force vector field is indicative of how parts of a first partial scan image are to be moved for registering the first partial scan image to a temporally subsequent second partial scan image. Thus, for each voxel of the respective partial scan image a three-dimensional force vector may be determined, wherein the respective three-dimensional force vector can be corrected by using the directional confidence map. In particular, if at a voxel position the force vector points in a certain direction and if the directional confidence map indicates that in this direction the confidence is rather low, the length of the force vector may be reduced or the force vector may even be eliminated. In an embodiment the determined confidence values of the confidence map are normalized such that they are within a range from 0 to 1 and these normalized directional confidence values, i.e. the corresponding normalized confidence vectors, are multiplied with the force vectors, in order to correct the force vector field. The corrected force vector field may then be smoothed by using, for instance, a regularization step, wherein the smoothed corrected force vector field may form the desired registration transformation. The regularization step can be a spatial smoothing which limits the frequency of change in space. It can also incorporate more sophisticated a-priori knowledge about the spatial appearance of the force vector field, for example, based on diffusion, elasticity or curvature.

The reconstruction unit 11, the confidence map providing unit 12 and the registration unit 13 can be regarded as being components of a registration apparatus 14 for registering images.

The processing device 10 further comprises a motion field determination unit 15 for determining a motion field describing a movement of the object based on the determined registration transformations, wherein the reconstruction unit 11 is adapted to reconstruct a motion-compensated image of the object based on the acquired projection data values and the determined motion field. The registration transformations may directly form the motion field or the registration transformations may be further processed for forming the motion field. For reconstructing the motion-compensated image known motion-compensation reconstruction algorithms can be used like the algorithms disclosed in the articles "Motion Compensated Backprojection versus Back-project-then-Warp for Motion Compensated Reconstruction" by B. Brendel et al., The Third International Conference on Image Formation in X-Ray Computed Tomography, pages 169 to 172, Salt Lake City, USA (2014) and "A motion-compensated scheme for helical cone-beam reconstruction in cardiac CT angiography" by U. van Stevendaal et al., Medical Physics, volume 35, number 7, pages 3239 to 3251 (2008), which are herewith incorporated by reference.

Figure 3:
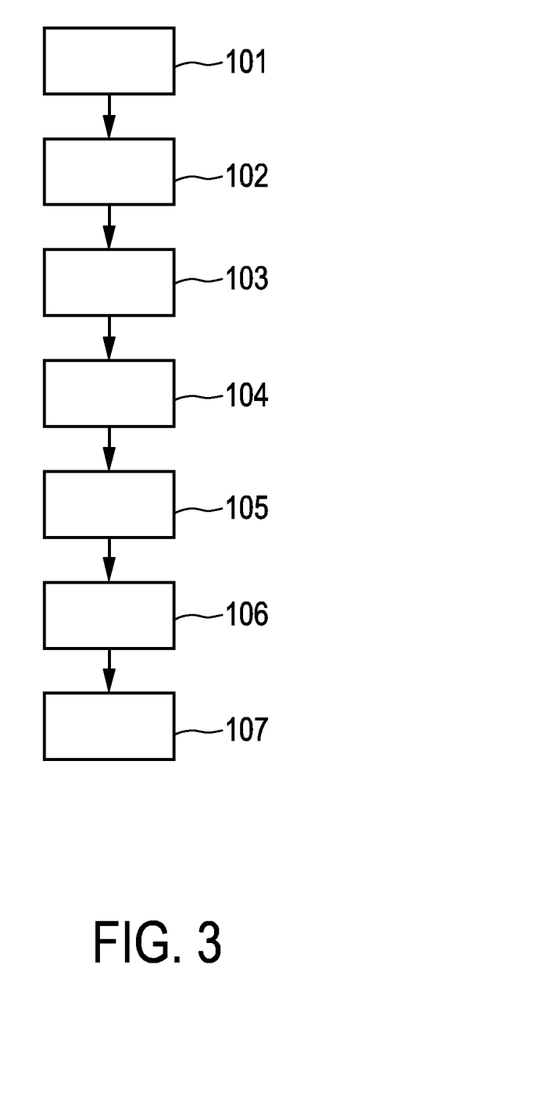
FIG. 3 shows a flowchart exemplarily illustrating an embodiment of a CT method for generating an image of a moving object.

In the following an embodiment of an imaging method for generating an image of a moving object will exemplarily be described with reference to a flowchart shown in FIG. 3.

In step 101 the radiation source 2 is rotated around the object, while the radiation source 2 emits x-rays traversing the object and the detector 6 generates projection data values based on detected x-rays after having traversed the object. In step 102 the reconstruction unit 11 reconstructs partial scan images which correspond to different times and in step 103 the confidence map providing unit 12 determines a directional confidence map for each partial scan image. In step 104 the registration unit 13 determines a respective registration transformation of a respective partial scan image for registering the respective partial scan image with a temporally neighboring partial scan image under consideration of the respective directional confidence map. In step 105 the motion field determination unit 15 determines a motion field describing a movement of the object based on the determined registration transformations and in step 106 the registration unit 11 reconstructs a motion-compensated image of the object based on the acquired projection data values and the determined motion field which may also be named motion vector field. In step 107 the reconstructed motion-compensated image is shown on the display 17. Steps 100 to 104 can be regarded as being steps of a registration method for registering images.

Although in an above described embodiment the confidence map providing unit has provided a certain directional confidence map in accordance with equations (4) to (8), in other embodiments the confidence map providing unit can be adapted to provide another directional confidence map. For instance, in an embodiment the intermediate values may not consider the inverse variances or they may not consider the weights with which the respective projection data values have been weighted. Thus, in equations (4) to (6) the expression $pw_n \cdot A(\overline{x}, n, \overline{d})$ or the expression $[\sigma^2(n, \overline{d})]^{-1}$ may be omitted. It is also possible that in equations (4) to (6) instead of the squared weights, the weights are directly used, i.e. that not the squared weights, but the direct weights are used, wherein also in this case the inverse variance may be considered as shown in equations (4) to (6) or not. Moreover, if the images are reconstructed in another way, i.e. by using another reconstruction algorithm, the weights may be different.

The confidence map providing unit may also be adapted to provide an isotropic confidence map. An isotropic confidence map can be, for instance, $S(\overline{x})$ as defined in equation (6), wherein the combined weight $pw_n \cdot A(\overline{x}, n, \overline{d})$ or the inverse variance $[\sigma^{-2}(n, \overline{d})]^{-1}$ may be omitted.

Resolution and hence information on structures that can be used for registration will be strongest perpendicular to the mean or dominant view direction and least parallel to it, wherein, if several views, respectively detector/source positions, are used for reconstructing an image, the view having the largest weight can be regarded as defining the mean or dominant view direction. In FIG. 2 the mean or dominant view directions are therefore minus 120 degrees, minus 60 degrees, zero degrees, 60 degrees and 120 degrees. In order to avoid, or at least reduce the likelihood of, basing the registration on image features which are not caused by true structures of the object, but which are caused by artifacts, it is proposed to add a specific confidence to image features used by the registration algorithm, in order to steer the registration process towards those image features that actually stem from real data and not from artifacts. During the filtered backprojection process for reconstructing the different images also the intermediate values, which can be used for determining directional and/or the isotropic confidence maps, may be calculated. The directional confidence map and/or the isotropic confidence may then be determined based on the already pre-calculated intermediate values, when the directional confidence map and/or the isotropic confidence is needed really. The isotropic confidence map may be based on a sum of weights or of squared weights, a sum of inverse variances and/or a sum of a combination of a) weights or squared weights and b) inverse variances, wherein the sum is the sum over all rays used for the reconstructing a respective image value, the weights are the weights, with which the corresponding projection data values are weighted, before being backprojected while reconstructing the respective image value, and the inverse variance is the inverse variance of the respective projection data values. The directional confidence map, which is useful, if the registration should be based on directional image features like edges or gradients, can be determined by also considering the respective ray angle.

The registration unit can be adapted to use any standard registration algorithm. However, preferentially a standard registration algorithm is used which includes a force term usually derived from a similarity measure. The registration algorithm is preferentially a deformable registration algorithm, wherein the force term is used to steer the deformation. Preferentially, the force term is computed voxel-wise and describes for each image voxel a direction into which the voxel under consideration is proposed to move. The force term can therefore also be regarded as being a force vector, wherein the force vectors determined for the different voxels define a force vector field. Artifacts like motion artifacts or limited angle artifacts can deteriorate the force vector field, possibly leading to non-optimal registration results. The registration unit is therefore preferentially adapted to include the derived confidence map into the force term computation, in order to focus on image information stemming from real data.

The similarity measure describes how similar two images are and usually assigns a similarity value to them. To improve/optimize the similarity, one possible known implementation is to study the similarity measure as an optimization problem. From calculus, the optimization problem can be solved, for instance, by computing a zero of a derivative of the similarity measure. Usually, the derivative has the form of a directional derivative (Gateaux-derivative). From this, a force vector field results.

The registration unit can be adapted to normalize the confidence map to an interval [0,1] such that a value of 1 indicates a high confidence, i.e. a low probability for an artifact, and a value of 0 indicates a low confidence, i.e. a high probability for an artifact. The reconstruction unit can be further adapted to modify the force term by adding the confidence map as a factor, wherein it should be noted that both, the force vector field and the confidence map, contain direction-specific information. Thus, for instance, at a certain voxel position the force term may provide three force values for three different directions and the confidence map may provide three confidence values for three different directions, wherein the force values and confidence values of a respective same direction may be multiplied for correcting the respective force value.

The registration unit may use, for instance, the sum of squared differences (SSD) as similarity measure, wherein the force term may be given as the product of a residuum, i.e. the difference between a deformed first image and a second image, and a spatial gradient of the deformed first image. Adding the confidence map as a factor will down weight or even cancel force term contributions for which the confidence value is low, especially zero. Also other similarity measures may be used like the normalized gradient fields (NGF) similarity measure, wherein the force term is given as the scalar product or cross product of normalized spatial derivatives of the deformed first image and the second image multiplied with further image derivative terms. Also in this case, adding the confidence map as another factor will down weight or even cancel force term contributions for which the confidence value is low, especially zero. Further possible similarity measures are, for instance, correlation-based or mutual-information-based similarity measures.

After the force terms, i.e. the force vectors forming the force vector field, have been corrected by using the confidence map, the registration unit can perform the image registration step as usual, i.e. determine a registration transformation based on the corrected force vector field, wherein force term contributions stemming from artifacts are down weighted, especially no longer present, in the force vector field and can therefore no longer steer the computed deformation. In particular, the corrected force vector field is smoothed, wherein the corrected force vector field forms the registration transformation.

The registration unit is preferentially adapted to determine the registration transformation of the first image for registering the first image to the second image under consideration of the confidence map iteratively, wherein in each iteration step the first image is deformed, in order to better correspond to the second image, and wherein also the confidence map is deformed, wherein in a next iteration step the deformed first image and the deformed confidence map are used for determining an updated registration transformation. The iteration may be performed, until an abort criterion has been fulfilled, for instance, until a similarity measure being indicative of a degree of similarity of the first and second images is larger than a predefined threshold or until a predetermined number of iteration steps has been performed.

In an embodiment a first confidence map for the first image and a second confidence map for the second image is used, wherein a combined confidence map is determined based on the first and second confidence maps and wherein the combined confidence map is used for determining the registration transformation for registering the first and second images to each other. The combined combination map may be a pointwise product of the first and second confidence maps. However, the first and second confidence maps can also be combined in another way for providing the combined confidence map. For instance, a pointwise minimum of the first and second confidence maps can be used as the combined confidence map. If the registration unit is adapted to deform the first image for registering the first and second images to each other and if the registration process is performed iteratively, in each iteration step the registration unit deforms the first confidence map in accordance with the registration transformation, which has been determined in the previous iteration step and which defines a deformation of the first image, wherein a combined confidence map is determined based on the deformed first confidence map and the second confidence map and wherein an updated registration transformation, which defines an updated deformation of the first image, is determined under consideration of the combined confidence map. The deformed first image is then used in the next iteration step together with the correspondingly deformed first confidence map for again updating the registration transformation. In another embodiment also only the second image or the first image and the second image can be deformed in each iteration step.

The determination of the confidence map and the registration of images under consideration of the confidence map can be applied to, for instance, myocardial perfusion CT imaging, wherein partial sub-scans can be used for the motion estimation and compensation. The temporal resolution and hence the registration can be improved and a higher accuracy of perfusion quantification can be achieved. The determination of the confidence map and the registration under consideration of the determined confidence map can also be applied to sparse sampling CT imaging, wherein only very few angular samples are acquired for the generation of an image for a certain time, i.e. of a temporal frame. For instance, the radiation source may rotate several times around the object while projection data values are sparsely sampled, wherein based on projection data values acquired during a respective single rotation a CT image may be reconstructed such that for different rotations different CT images are reconstructed. For these CT images confidence maps may be determined and the CT images may be registered to each other under consideration of the confidence maps. The confidence maps may have a relatively regular temporal distribution, but the confidence maps may contain significant variations with respect to the angular coordinate.

Although in above described embodiments the images are CT images, in other embodiments the images can also be other kind of images, i.e. the determination of confidence map and the registration under consideration of the determined confidence map can also be performed, if the images are not CT images which have been reconstructed based on projection data values acquired by a CT system. For instance, the images can also be images which have been reconstructed based on projection data values acquired by an x-ray C-arm system. Moreover, the images do not need to be partial scan images, i.e., for instance, they can also be images where each voxel has been reconstructed by using projection data values corresponding to a full 180 degrees view angle range or a larger view angle range.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Procedures like the reconstruction of the images, the determination of the confidence map, the registration of the images, the determination of the motion field et cetera performed by one or several units or devices can be performed by any other number of units or devices. These procedures and/or the control of the registration apparatus in accordance with the registration method and/or the control of the CT system in accordance with a CT method can be implemented as program code means of a computer program and/or as dedicated hardware.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention relates to a registration apparatus for registering images. The registration apparatus comprises an images providing unit for providing a first image and a second image of an object, a confidence map providing unit for providing a confidence map comprising for different positions in the first image confidence values being indicative of a likelihood that an image feature is caused by a structure of the object, and a registration unit for determining a registration transformation for registering the first image and the second image to each other under consideration of the confidence map. This allows for a consideration of the confidence that an image feature is really caused by a structure of the object and not by an image artifact, thereby leading to an improved registration of the images.

The invention claimed is:

1. A registration apparatus for registering images, comprising:
at least one processor configured to:
provide a first image and a second image of an object, wherein an image element of the first image at a respective position is reconstructed by multiplying projection data values, assigned to rays traversing the image element, with weights and by backprojecting the weighted projection data values along the rays;
provide a confidence map comprising, for different positions in the first image, confidence values being indicative of a likelihood that an image feature is caused by a structure of the object;
determine, for the image element, a confidence value by calculating a sum of a function, which depends on the respective weight, over the rays traversing the image element; and
determine a registration transformation for registering the first image and the second image to each other in view of the confidence map.

2. The registration apparatus as defined in claim 1, wherein the at least one processor is configured to provide a directional confidence map comprising, for different positions in the first image, confidence values being indicative of a directional likelihood that the image feature is caused by the structure of the object.

3. The registration apparatus as defined in claim 1, wherein the at least one processor is configured to provide an isotropic confidence map comprising, for different positions in the first image, confidence values being indicative of an isotropic likelihood that the image feature is caused by the structure of the object.

4. The registration apparatus as defined in claim 1, wherein the function further depends on the inverse variance of the respective projection data value.

5. The registration apparatus as defined in claim 1, wherein each ray has a ray angle relative to a reference line, wherein the function further depends on the respective ray angle.

6. The registration apparatus as defined in claim 5, wherein the at least one processor is configured to:
determine, for the image element, a first intermediate value by calculating a sum of a first function, which depends on the respective weight and has a first dependence on the respective ray angle, over the rays traversing the image element;
determine, for the image element, a second intermediate value by calculating a sum of a second function, which depends on the respective weight and has a second dependence on the respective ray angle, over the rays traversing the image element; and
determine the confidence value for the image element based on the determined first and second intermediate values.

7. The registration apparatus as defined in claim 6, wherein the first function and the second function further depend on the inverse variance of the respective projection data value.

8. The registration apparatus as defined in claim 6, wherein the at least one processor is configured to:
  determine, for the image element, a third intermediate value by calculating a sum of a third function, which depends on the weight of the respective projection data value but does not depend on the respective ray angle, over the rays traversing the image element;
  determine the confidence value for the image element based on the determined first, second and third intermediate values.

9. The registration apparatus as defined in claim 8, wherein the third function further depends on the inverse variance of the respective projection data value.

10. The registration apparatus as defined in claim 1, wherein the at least one processor is configured to:
  determine a force vector field by applying a force vector field determination algorithm to the first and second images, wherein the force vector field indicates, for different positions within at least one of the first and second images, virtual forces to be applied to the at least one of the first and second images at the respective positions for registering the first and second images to each other;
  correct the force vector field by using the confidence map; and
  determine the registration transformation based on the corrected force vector field.

11. The registration apparatus as defined in claim 1, wherein the at least one processor is configured to
  provide a further confidence map comprising, for different positions in the second image, confidence values being indicative of a likelihood that the image feature is caused by the structure of the object;
    determine a registration transformation for registering the first and second images to each other under consideration of the confidence map comprising, for different positions in the first image, confidence values being indicative of a likelihood that the image feature is caused by the structure of the object, and the further confidence map.

12. An imaging system for generating an image of a moving object, comprising:
  a registration apparatus as defined in claim 1 for determining a registration transformation for registering a first image and a second image to each other, wherein the at least one processor is configured to provide the first image and the second image such that they show the same object at different times, wherein the first and second images are reconstructed based on projection data values acquired in different acquisition directions;
  the at least one processor being further configured to determine a motion field describing a movement of the object based on the determined registration transformation, and reconstruct a motion-compensated image of the object based on the provided projection data values and the determined motion field.

13. A registration method for registering images, comprising:
  providing a first image and a second image of an object, wherein an image element of the first image at a respective position is reconstructed by multiplying projection data values, assigned to rays traversing the image element, with weights and by backprojecting the weighted projection data values along the rays;
  providing a confidence map comprising, for different positions in the first image, confidence values being indicative of a likelihood that an image feature is caused by a structure of the object, wherein a confidence value for the image element is determined by calculating a sum of a function, which depends on the respective weight, over the rays traversing the image element; and
  determining a registration transformation for registering the first image and the second image to each other in view of the confidence map.

14. A non-transitory computer-readable medium having one or more executable instructions stored thereon, which, when executed by a processor, cause the processor to perform a registration method for registering images, comprising:
  providing a first image and a second image of an object, wherein an image element of the first image at a respective position is reconstructed by multiplying projection data values, assigned to rays traversing the image element, with weights and by backprojecting the weighted projection data values along the rays;
  providing a confidence map comprising, for different positions in the first image, confidence values being indicative of a likelihood that an image feature is caused by a structure of the object, wherein a confidence value for the image element is determined by calculating a sum of a function, which depends on the respective weight, over the rays traversing the image element; and
  determining a registration transformation for registering the first image and the second image to each other in view of the confidence map.

* * * * *